US012316984B2

(12) United States Patent
Fang et al.

(10) Patent No.: US 12,316,984 B2
(45) Date of Patent: May 27, 2025

(54) SYSTEM AND METHOD FOR INTELLIGENT SENSING AND COMPUTING OF IMMERSIVE LIGHT FIELD

(71) Applicant: Tsinghua University, Beijing (CN)

(72) Inventors: Lu Fang, Beijing (CN); Tao Yu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 155 days.

(21) Appl. No.: 18/460,997

(22) Filed: Sep. 5, 2023

(65) Prior Publication Data
US 2024/0422445 A1    Dec. 19, 2024

(30) Foreign Application Priority Data
Jun. 19, 2023    (CN) ......................... 202310721988.X

(51) Int. Cl.
*H04N 23/957* (2023.01)
*H04N 23/661* (2023.01)
*H04N 23/90* (2023.01)

(52) U.S. Cl.
CPC ......... *H04N 23/957* (2023.01); *H04N 23/661* (2023.01); *H04N 23/90* (2023.01)

(58) Field of Classification Search
CPC ..... H04N 23/957; H04N 23/661; H04N 23/90
See application file for complete search history.

(56) References Cited

U.S. PATENT DOCUMENTS

| | | | | |
|---|---|---|---|---|
| 2010/0033567 A1* | 2/2010 | Gupta | .................. | H04N 17/002 348/E17.001 |
| 2016/0307372 A1* | 10/2016 | Pitts | ..................... | H04N 23/957 |
| 2021/0368157 A1* | 11/2021 | Overbeck | ............ | H04N 13/161 |

OTHER PUBLICATIONS

CNIPA, First Office Action for CN Application No. 202310721988.X, Jul. 22, 2023.

* cited by examiner

*Primary Examiner* — Jonathan R Messmore
(74) *Attorney, Agent, or Firm* — Hodgson Russ LLP

(57) ABSTRACT

A system for intelligent sensing and computing of an immersive light field includes a mobile platform, a support, an acquisition array, a control system and a computing system. The control system and the acquisition array are fixed on the support that is in form of hemisphere. The support changes a pose through the mobile platform. The acquisition array includes acquisition cameras of multiple views that are uniformly distributed and fixed on the support, and lenses of the acquisition cameras point to outside from a sphere center and are configured to acquire video images at a plurality of pitch angles. The control system is connected to the acquisition array and configured to transmit the video images to a control device for data storage, and the computing system is configured to acquire the video images in the control device and generate an immersive light field video based on the video images.

5 Claims, 4 Drawing Sheets

SYSTEM AND METHOD FOR INTELLIGENT SENSING AND COMPUTING OF IMMERSIVE LIGHT FIELD

CROSS-REFERENCE TO RELATED APPLICATIONS

This application claims priority to Chinese Patent Application No. 202310721988.X, filed on Jun. 19, 2023, the entire disclosure of which is incorporated by reference herein.

TECHNICAL FIELD

The disclosure relates to a field of immersive light field reconstruction technologies, and particularly to a system and a method for intelligent sensing and computing of an immersive light field.

BACKGROUND

A light field is a representation of a light set in a three-dimensional space, and is acquired and displayed to visually reconstruct a real world. A reconstruction of an immersive light field is aimed to achieve a six-degree-of-freedom large-range immersive viewing experience for a real scenario, which needs to support high-quality scenario reconstruction and vivid rendering of any observation view angle, and a position can be moved to achieve a viewing experience during roaming.

A panoramic camera uses a plurality of lenses as a camera body, takes a scene by using lenses in all directions using a conventional shooting mode, and splices pictures of all angles into a panoramic image. A light field camera directly acquires a spatial light field using a main lens and a microlens array, images with different depths of field and angles may be obtained by single shooting.

A panoramic image acquired and synthesized by the panoramic camera allows a viewer to observe a scene of three-degree-of-freedom, i.e., up and down, front and back and left and right, from a camera position. However, due to a limited length of a baseline between lenses and a relatively fixed viewpoint, a six-degree-of-freedom viewing feeling including movement cannot be provided. The light field camera may quickly acquire dense multi-view images via a dense micro-lens array, but is limited by that a total number of imaging pixels=a number of micro-lenses*a number of single-view pixels. A spatial resolution represented by a number of effective single-view pixels is low, and a parallax of a multiocular vision is associated with a distance between cameras, i.e., a baseline length. Due to a limited size of the micro-lenses, the baseline length of the micro-lens cannot exceed a size of an imaging chip. Therefore, when an object is far away from the camera, a depth resolution is relatively affected.

SUMMARY

According to a first aspect of embodiments of the disclosure, a system for intelligent sensing and computing of an immersive light field is provided. The system includes a mobile platform, a support, an acquisition array, a control system and a computing system.

The control system and the acquisition array are fixed on the support that is in form of hemisphere.

The support changes a pose through the mobile platform.

The acquisition array comprises acquisition cameras of multiple views, the acquisition cameras are uniformly distributed and fixed on the support by a connector, and lenses of the acquisition cameras point to outside from a sphere center and are configured to acquire video images at a plurality of pitch angles.

The control system is connected to the acquisition array and configured to transmit the video images to a control device for data storage, and the computing system is configured to acquire the video images in the control device and generate an immersive light field video based on the video images.

According to a second aspect of embodiments of the disclosure, a method for intelligent sensing and computing of an immersive light field is provided. The method includes:

obtaining connection results of a plurality of cameras by establishing a connection to the plurality of cameras and initializing camera parameters;

obtaining shooting parameters and shooting modes of the cameras based on the connection results of the cameras and state query results;

performing video acquisition based on the shooting parameters and the shooting modes in response to a synchronous acquisition instruction, and monitoring a first camera working state in an acquisition process; and obtaining a second camera working state based on the first camera working state in response to a synchronous stop instruction, to transmit acquired video data in response to a transmission instruction and generate light field video data by using the video data.

Additional aspects and advantages of the present disclosure will be set forth in part in the following description, and in part will become obvious from the following description, or may be learned by practice of the disclosure.

BRIEF DESCRIPTION OF THE DRAWINGS

The above and/or additional aspects and advantages of the present disclosure will become obvious and easy to understand from the following description of the embodiments in conjunction with the accompanying drawings, in which.

DETAILED DESCRIPTION

Embodiments of the present disclosure are described in detail below, and examples of embodiments are illustrated in the accompanying drawings, in which the same or similar labels represent the same or similar elements or elements with the same or similar functions. The embodiments described below with reference to the drawings are exemplary intended to explain the present disclosure and are not to be construed as a limitation of the present disclosure.

A system, a method and an apparatus for intelligent sensing and computing of an immersive light field proposed according to embodiments of the present disclosure are described referring to attached drawings.

At first, a system for intelligent sensing and computing of an immersive light field according to embodiments of the present disclosure is described referring to attached drawings.

Figure 1:
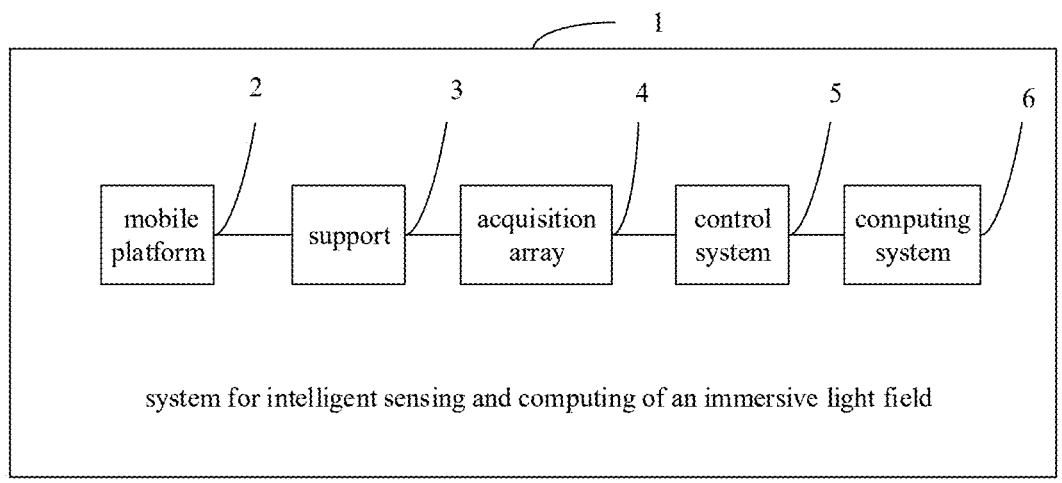
FIG. 1 is a block diagram illustrating a system for intelligent sensing and computing of an immersive light field according to embodiments of the present disclosure.

FIG. 1 is a block diagram illustrating a system for intelligent sensing and computing of an immersive light field according to embodiments of the present disclosure.

As illustrated in FIG. 1, the system for intelligent sensing and computing of an immersive light field includes a mobile platform 2, a support 3, an acquisition array 4, a control system 5 and a computing system 6.

The control system 5 and the acquisition array 4 are fixed on the support 3 that is in form of hemisphere.

The support 3 changes a pose through the mobile platform 2.

The acquisition array 4 includes acquisition cameras of multiple views, the acquisition cameras are uniformly distributed and fixed on the support 3 by a connector, and lenses of the acquisition cameras points to outside from a sphere center and are configured to acquire video images at a plurality of pitch angles.

The control system 4 is connected to the acquisition array 4 and configured to transmit the video images to a control device for data storage, and the computing system 6 is configured to acquire the video images in the control device and generate an immersive light field video based on the video images.

It can be understood that the control system 5 may be connected to the acquisition array via a data cable, and may synchronize or specify settings of functions and parameters of respective cameras in the acquisition array, and may synchronize starting and stopping a shooting process of the acquisition array 4, and transmits the acquired image and video to the control device for storage via the data cable, and the computing system acquires the image and video in the control device via a network cable and intelligently generates an immersive light field video, which provides roaming viewing and immersive interaction experiences.

In an embodiment, the support may change its position, angle and height with the mobile platform. The support is a hemispherical transparent acrylic shell with a radius of 0.5 m, and an edge with a width of 2 cm is extended at the bottom, which may be firmly fixed on a vertically mounted electronic control lifting column on the mobile platform by a long-strip metal bracket. Four universal wheels are mounted at the bottom of the mobile platform to support indoor and outdoor movement.

Figure 2:
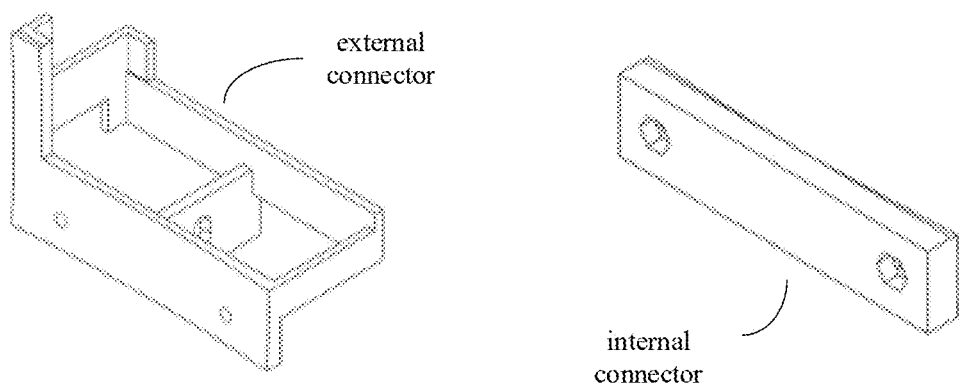
FIG. 2 is a diagram illustrating a set of connectors according to embodiments of the present disclosure.

In an example, each camera in the acquisition array is fixed on the support spherical shell via a set of connectors. As illustrated in FIG. 2, the set of connectors includes an internal connector and an external connector. A camera is connected to the external connector by screws. The camera and the external connector are placed outside the spherical shell. The internal connector is placed inside the spherical shell, and fixed to the external connector by screws passing through the spherical shell to ensure that the camera is firmly mounted on the spherical shell.

Figure 3:
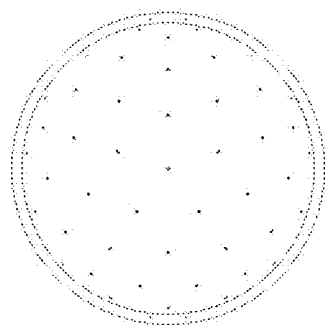
FIG. 3 is a diagram illustrating a connection of an action camera of an acquisition array according to embodiments of the present disclosure.

In an example, the acquisition array consists of 46 action cameras. According to the positioning of the cameras on the spherical shell as illustrated in FIG. 3, the cameras are uniformly distributed on the spherical shell. A distance between adjacent cameras is about 20 cm, and a farthest baseline length is about 1 m, and the camera as a whole is mounted on the mobile platform in a vertical form. Each camera may acquire a 5.5K60FPS color video or a 4K120FPS color video, which may support tasks of large-range space reconstruction, new angle of view generation, light field reconstruction, and the like.

The system for intelligent sensing and computing of an immersive light field according to embodiments of the present disclosure can provide a six-degree-of-freedom large-range immersive viewing experience, and a liftable mobile platform can also provide rich multi-view images and light field reconstruction targets for reconstruction of large-range indoor and outdoor scenarios, new angle of views generation, and other technologies. An automatic acquisition software may reduce difficulty of a light field acquisition operation and improve acquisition accuracy.

A method for intelligent sensing and computing of an immersive light field according to embodiments of the present disclosure is described referring to attached drawings.

Figure 4:
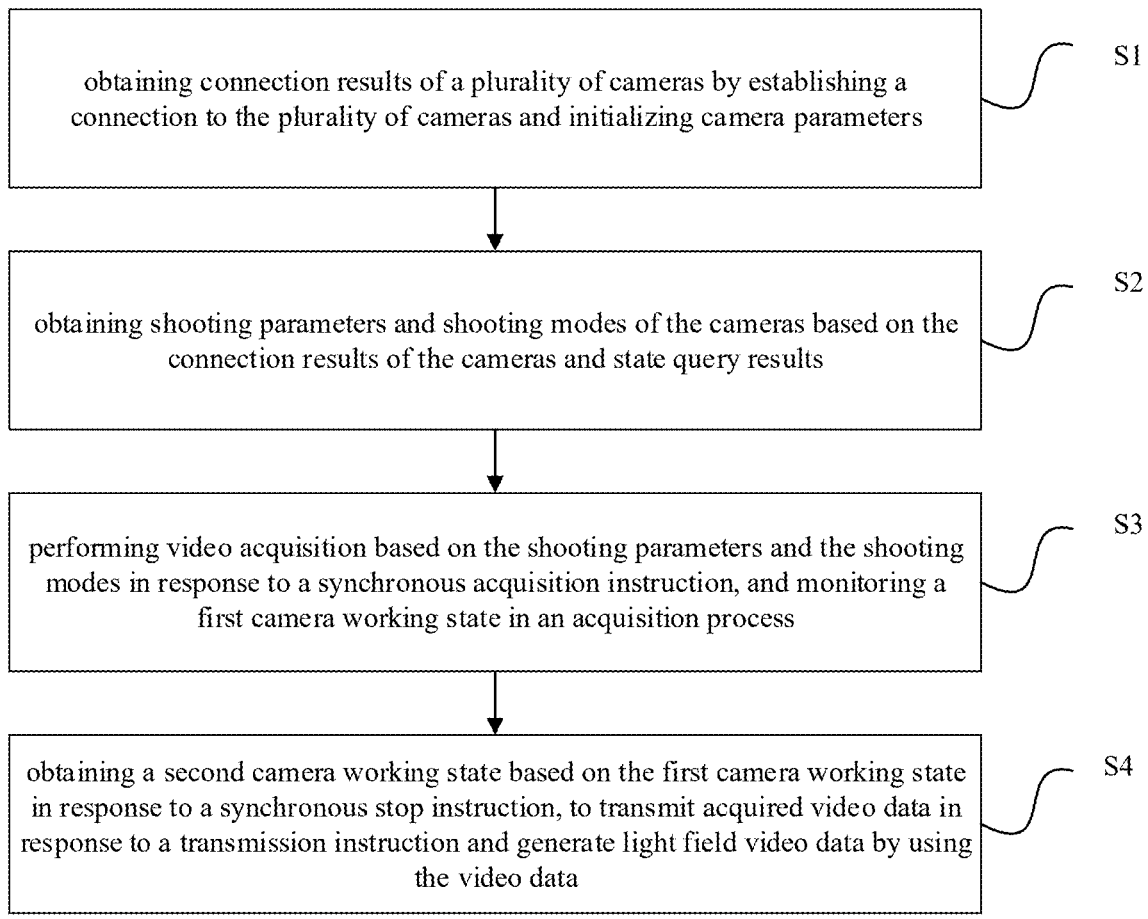
FIG. 4 is a diagram illustrating a method for intelligent sensing and computing of an immersive light field according to embodiments of the present disclosure.

FIG. 4 is a diagram illustrating a method for intelligent sensing and computing of an immersive light field according to embodiments of the present disclosure.

As illustrated in FIG. 4, the method includes the following steps.

At S1, connection results of a plurality of cameras are obtained by establishing a connection to the plurality of cameras and initializing camera parameters.

At S2, shooting parameters and shooting modes of the cameras are obtained based on the connection results of the cameras and state query results.

At S3, a video acquisition is performed based on the shooting parameters and the shooting modes in response to a synchronous acquisition instruction, and a first camera working state is monitored in an acquisition process.

At S4, a second camera working state is obtained based on the first camera working state in response to a synchronous stop instruction, to transmit acquired video data in response to a transmission instruction and generate light field video data by using the video data.

Figure 5:
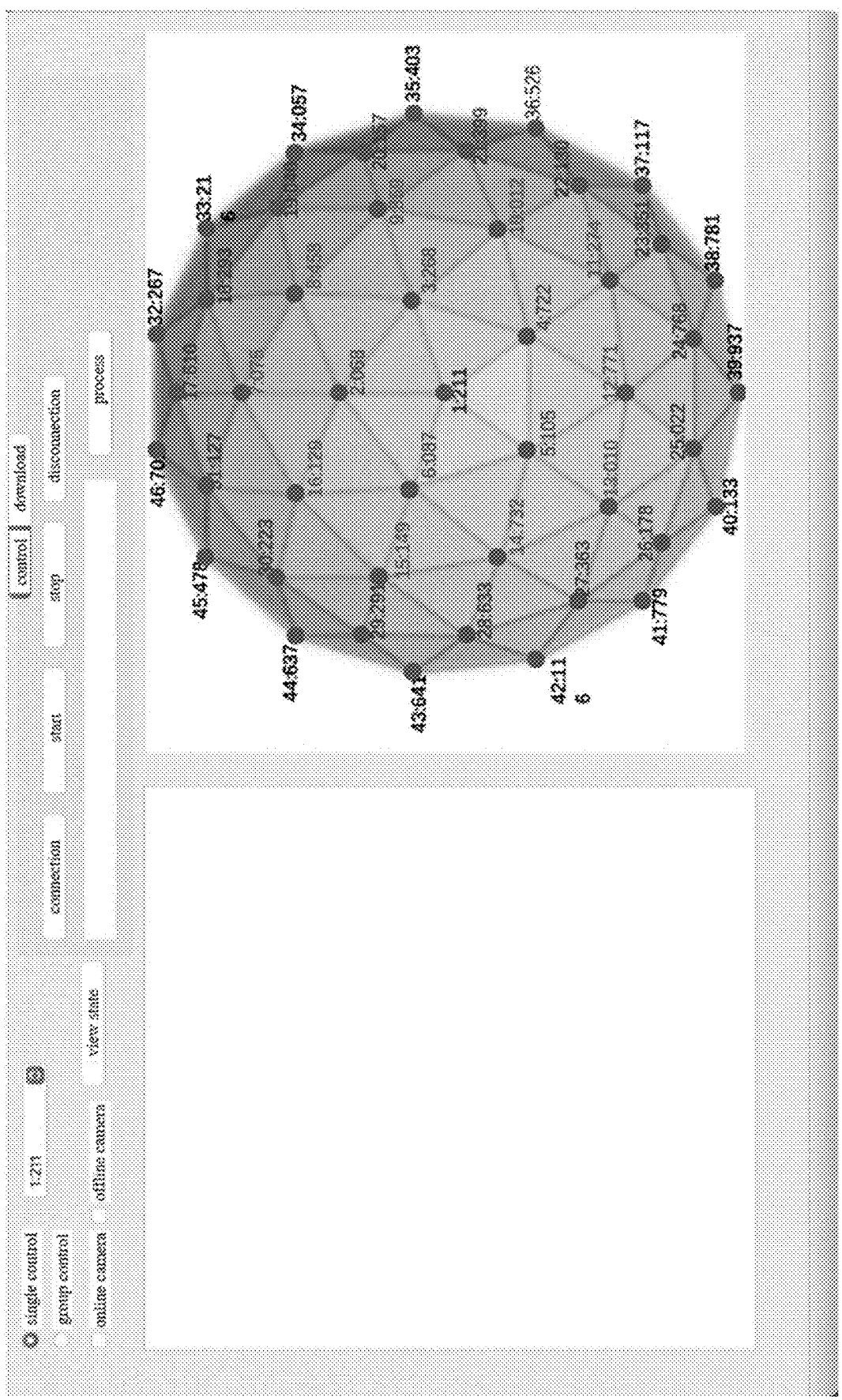
FIG. 5 is a diagram illustrating a control software interface according to embodiments of the present disclosure.

Specifically, the control system uses a notebook computer as a control hardware, and is connected to each camera of the acquisition array via a USB multi-port expander. An operator can operate the acquisition array using the control software as illustrated in FIG. 5, and a light field acquisition may be performed according to the following implementation process:

1) attempting to connect and initializing each camera;
2) querying a state of each camera, and setting a shooting parameter and a shooting mode of the camera;
3) sending a synchronous acquisition instruction;
4) monitoring a working state in an acquisition process;
5) sending a synchronous stop instruction;
6) transmitting and summarizing acquired videos; and
7) intelligently generating a light field video.

In an embodiment, attempting to connect and initialize each camera includes: a serial number and a corresponding IP of each of the plurality of cameras are acquired from a prestored list; and an initialization instruction is sent to the camera based on the serial number and the corresponding IP and a preset connection mode, and a correct return value is obtained within a preset time, to obtain a connection result that the camera is successfully connected.

Specifically, a serial number and a corresponding IP of each of the plurality of cameras are acquired from a prestored list; an initialization instruction is sent to a Gopro camera by a curl or other connection mode, and a correct return value is successfully obtained within a specified time, indicating that the camera is successfully connected, and a subsequent operation can be performed.

In an embodiment, querying the state of each camera and setting the shooting parameter and the shooting mode of the camera include: a first state query instruction is acquired based on the connection result that the camera is successfully connected, and a camera response result is obtained in response to the first state query instruction; the state query result is obtained by analyzing data related to the camera response result, in which the state query result includes a usb control state, a video recording state and an idle state; and shooting data of a camera in a normal state is determined based on the state query result, and an optimal shooting parameter and an optimal shooting mode of the camera are obtained based on the shooting data.

Specifically, a state query instruction is sent to a successfully connected camera, and when a return message is obtained, related information is analyzed to obtain a usb control state, a video recording state and an idle state, and they are recorded. A next step of parameter and mode setting may be performed on the camera in the normal state, and when the parameters and modes, such as a shooting resolution, a frame rate, a field of view and an anti-shake function, are sent to the Gopro in the form of an instruction, waiting for a return message. A correct return value is successfully obtained within a specified time, indicating that the camera parameters are set normally, and a next operation may be performed. Otherwise, setting needs to be repeated until normal.

In an embodiment, sending the synchronous acquisition instruction and monitoring the working state in an acquisition process includes: an acquisition instruction is sent to the camera in the normal state in a multi-thread form based on the optimal shoot parameter and the optimal shooting mode of the camera; and the data acquisition is performed in response to the acquisition instruction, a second state query instruction is sent to all cameras in the acquisition process, and the first camera working state is obtained in response to the second state query instruction to correct data of a camera in an abnormal state.

Specifically, for the camera successfully set in the previous step, an acquisition instruction is sent in a multi-thread form, and a return message is recorded, and an acquisition instruction needs to be separately sent for a camera that does not start normal acquisition until acquisition is started, and a timestamp of successful acquisition is recorded, so that an acquisition time is restored based on the timestamp in a later period.

Further, a state query instruction is sent to all cameras periodically in an acquisition process, and no operation is performed on a camera that is being in acquisition. If a camera stops acquisition due to accidents such as camera disconnection and an insufficient storage space, a camera state needs to be recorded, and an indication is given in a monitoring interface until the accident is corrected.

In an embodiment, sending a synchronous stop instruction, transmitting and summarizing an acquired video, and intelligently generating a light field video includes: the transmission instruction is generated by using the control device, and the acquired video data is summarized and transmitted in response to the transmission instruction to obtain video summary results; and same-time images of all angles are obtained by synchronizing the video summary results according to actual acquisition time based on the timestamps, and a large-range immersive light field video is generated by performing computation on the same-time images by using a neural radiation field method based on implicit representation.

Specifically, when an acquisition goal is completed, a stop instruction is sent in a multi-thread form, and a return message is recorded, and the stop instruction needs to be separately sent for a camera that does not normally stop acquisition until a normal stop, and a timestamp of successfully stopping acquisition is recorded, so that an acquisition time is restored based on the timestamp in a later period.

Further, the control device generates a transmission instruction in the forms of a specified file name, a start timestamp and a completion time based sorting, etc., and the video and image acquired from each camera are transmitted to a control terminal to complete acquisition.

Further, the computing system synchronizes all videos and images according to actual acquisition time based on the timestamps, and intelligently generates a large-range immersive light field video based on the same-time images of all angles. The computing method may use a neural radiation field technology based on implicit representation.

The method for intelligent sensing and computing of an immersive light field according to embodiments of the present disclosure can provide a six-degree-of-freedom large-range immersive viewing experience, and a liftable mobile platform can also provide rich multi-view images and light field reconstruction targets for reconstruction of large-range indoor and outdoor scenarios, new angle of views generation, and other technologies. An automatic acquisition software can reduce difficulty of a light field acquisition operation and improve acquisition accuracy.

Figure 6:
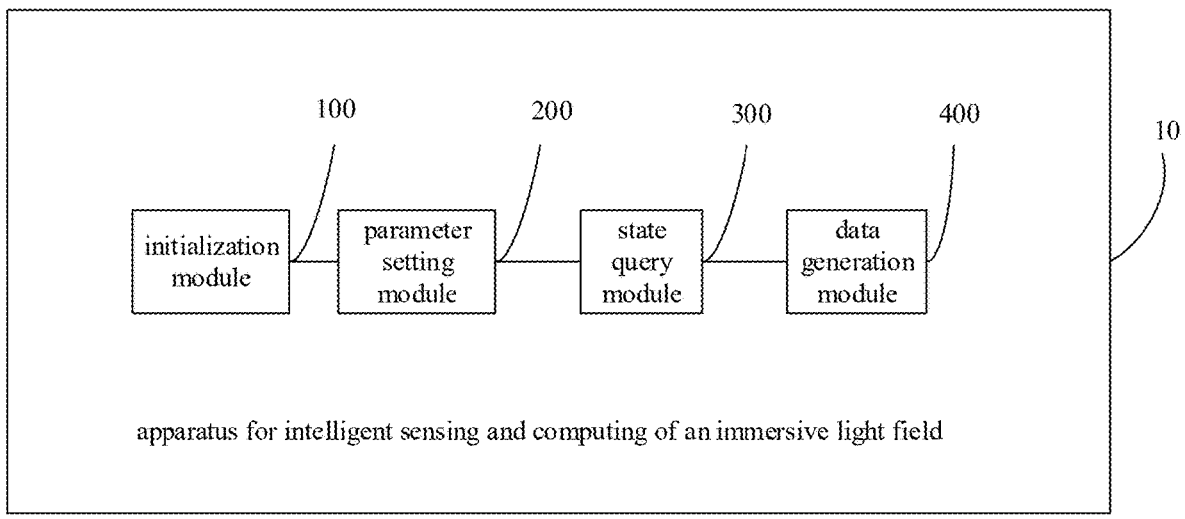
FIG. 6 is a block diagram illustrating an apparatus for intelligent sensing and computing of an immersive light field according to embodiments of the present disclosure.

To achieve the above embodiments, as illustrated in FIG. 6, an apparatus 10 for intelligent sensing and computing of an immersive light field is further provided in embodiments. The apparatus 10 includes an initialization module 100, a parameter setting module 200, a state query module 300 and a data generation module 400.

The initialization module 100 is configured to obtain connection results of a plurality of cameras by establishing a connection to the plurality of cameras and initializing camera parameters.

The parameter setting module 200 is configured to obtain shooting parameters and shooting modes of the cameras based on the connection results of the cameras and state query results;

The state query module 300 is configured to perform video acquisition based on the shooting parameters and the shooting modes in response to a synchronous acquisition instruction, and monitor a first camera working state in an acquisition process.

The data generation module 400 is configured to obtain a second camera working state based first camera working state in response to a synchronous stop instruction, to transmit acquired video data in response to a transmission instruction and generate light field video data by using the video data.

The apparatus for intelligent sensing and computing of an immersive light field according to embodiments of the present disclosure can provide a six-degree-of-freedom large-range immersive viewing experience, and a liftable mobile platform can also provide rich multi-view images and light field reconstruction targets for reconstruction of large-range indoor and outdoor scenarios, new angle of views generation, and other technologies. An automatic acquisition software can reduce difficulty of a light field acquisition operation and improve acquisition accuracy.

In addition, terms "first" and "second" used in the present disclosure are only for description purpose, and may not be understood as indicating or implying a relative importance or implying a number of technical features indicated by implication. Therefore, features limiting "first" and "second" may explicitly or implicitly include at least one of the features. In the description of the disclosure, "a plurality of" means at least two, for example two, three, etc., unless otherwise specified.

In descriptions of the specification, descriptions with reference to terms "one embodiment", "some embodiments", "example", "specific example" or "some examples" etc. mean specific features, structures, materials or characteristics described in conjunction with the embodiment or example are included in at least one embodiment or example of the present disclosure. In this specification, the schematic representations of the above terms do not have to be the same embodiment or example. Moreover, specific features, structures, materials or characteristics described may be combined in any one or more embodiments or examples in a suitable manner. In addition, those skilled in the art may combine different embodiments or examples and characteristics of different embodiments or examples described in this specification without contradicting each other.

It should be understood that, notwithstanding the embodiments of the present disclosure are shown and described above, the above embodiments are exemplary in nature and shall not be construed as a limitation of the present disclosure. Those skilled in the art may change, modify, substitute and vary the above embodiments within the scope of the disclosure.

What is claimed is:

1. A method for intelligent sensing and computing of an immersive light field, applicable to a system for intelligent sensing and computing of an immersive light field, comprising:
   obtaining connection results of a plurality of cameras by establishing a connection to the plurality of cameras and initializing camera parameters;
   obtaining shooting parameters and shooting modes of the plurality of cameras based on the connection results of the plurality of cameras and state query results;
   performing video acquisition based on the shooting parameters and the shooting modes in response to a synchronous acquisition instruction, and monitoring a first camera working state in an acquisition process; and
   obtaining a second camera working state based on the first camera working state in response to a synchronous stop instruction, to transmit acquired video data in response to a transmission instruction and generate light field video data by using the video data.

2. The method according to claim 1, wherein obtaining the connection results of the plurality of cameras by establishing the connection to the plurality of cameras and initializing the camera parameters comprises:

acquiring a serial number and a corresponding IP of each of the plurality of cameras from a prestored list; and
   sending an initialization instruction to the camera based on the serial number and the corresponding IP and a preset connection mode, and obtaining a correct return value within a preset time to obtain a connection result that the camera is successfully connected.

3. The method according to claim 2, wherein obtaining the shooting parameters and the shooting modes of the plurality of cameras based on the connection results of the plurality of cameras and the state query results comprises:
   acquiring a first state query instruction based on the connection result that the camera is successfully connected, and obtaining a camera response result in response to the first state query instruction;
   obtaining the state query result by analyzing data related to the camera response result, so as to determine whether the camera is in a normal state; wherein the state query result comprises a usb control state, a video recording state and an idle state; and
   determining shooting data of the camera in the normal state based on the state query result, and obtaining an optimal shooting parameter and an optimal shooting mode of the camera based on the shooting data.

4. The method according to claim 3, wherein performing video acquisition based on the shooting parameters and the shooting modes in response to the synchronous acquisition instruction, and monitoring the first camera working state in the acquisition process comprises:
   sending an acquisition instruction to the camera in the normal state in a multi-thread form based on the optimal shoot parameter and the optimal shooting mode of the camera; and
   performing the data acquisition in response to the acquisition instruction, sending a second state query instruction to all cameras in the acquisition process, and obtaining the first camera working state in response to the second state query instruction to correct data of a camera in an abnormal state.

5. The method according to claim 4, wherein timestamps are recorded respectively in response to the synchronous acquisition instruction and the synchronous stop instruction; and transmitting the acquired video data in response to the transmission instruction and generating the light field video data by using the video data comprises:
   generating the transmission instruction by using a control device, and summarizing and transmitting the acquired video data in response to the transmission instruction to obtain video summary results; and
   obtaining same-time images of all angles by synchronizing the video summary results according to actual acquisition time based on the timestamps, and generating a large-range immersive light field video by performing computation on the same-time images by using a neural radiation field method based on implicit representation.

\* \* \* \* \*